Figure 1:
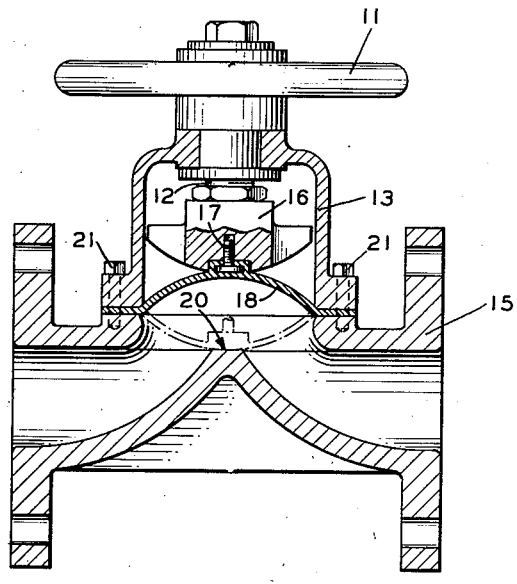

Oct. 23, 1956     L. C. RUBIN     2,767,956

FLEXIBLE VALVE DIAPHRAGM

Filed July 22, 1952

INVENTOR.
LOUIS C. RUBIN
BY G. H. Palmer
Cruzan Alexander
ATTORNEYS

United States Patent Office 2,767,956
Patented Oct. 23, 1956

2,767,956

FLEXIBLE VALVE DIAPHRAGM

Louis C. Rubin, West Caldwell, N. J., assignor to The M. W. Kellogg Company, Jersey City, N. J., a corporation of Delaware Application July 22, 1952, Serial No. 300,299

7 Claims. (Cl. 251—331)

This invention relates to the use of flexible diaphragms for diaphragm type valves, such as, for example, Saunders diaphragm valves and Crane diaphragm valves. Diaphragm type valves are used primarily for handling corrosive materials. The diaphragm heretofore has been of a plastic or rubbery or other type flexible material. In view of the use of the valve in corrosive systems, not only was this diaphragm of a flexible nature but it was also composed of a corrosive resistant material where possible. In prior uses of these diaphragms in such valves the diaphragms lasted for about 45 hours due to chemical attack. Materials of a nature highly resistant to corrosion could not be used because they were not sufficiently flexible. For example, polytetrafluoroethylene plastic although sufficiently inert for use as diaphragms in such valves was not sufficiently stable dimensionally. In this same category pure polytrifluorochloroethylene plastic was not sufficiently flexible as diaphragms in such valves.

It is an object of this invention to provide a composition sufficiently flexible and inert for use as a diaphragm in valves normally used in corrosive systems.

It is also an object of this invention to provide a design for a diaphragm valve which meets requirements as to flexibility and strength.

Various other objects and advantages of the present invention will become apparent to those skilled in the art from the accompanying description and disclosure.

According to this invention it has been found that plasticized polytrifluorochloroethylene thermoplastic diaphragms possess both the required inertness and flexibility for use in diaphragm valves. Such plasticized polytrifluorochloroethylene diaphragms have exhibited a life up to 8 or 9 months of service where previously used diaphragm materials lasted only a day or two under comparable conditions.

As an example of the composition of the diaphragm valve of the present invention the diaphragm consists essentially of 300 N. S. T. Kel-F plastic homopolymer of trifluorochloroethylene plasticized with 25 weight percent polytrifluorochloroethylene oil (75 weight percent plastic and 25 weight percent oil). The plastic polytrifluorochloroethylene must be of high N. S. T. material because it can be more readily maintained in amorphous form and will, therefore, retain the plasticizer thoroughly dispersed therein. The amorphous condition of the diaphragm is an essential element of the diaphragm valve of the present invention and results in the maximum flexibility and length of life. The use of molding techniques and treatments which result in diaphragms of minimum crystallinity produce more satisfactory diaphragms. Suitable treating and molding techniques for obtaining amorphous diaphragms of polytrifluorochloroethylene plastic involve quenching from a molding temperature above the transition temperature of the plastic, i. e. 390° F., or by heating the plastic diaphragm above the transition temperature and rapidly cooling the diaphragm in cold water or other cooling medium.

The N. S. T. of the polytrifluorochloroethylene plastic of the diaphragms of this invention are within the range of 250° C. to 350° C. and it is preferred to maintain the N. S. T. of the plastic above 300° C. in order that the plastic may be more readily maintained in the amorphous form and also to retain the maximum amount of plasticizer.

The proportion of plasticizer is also an important factor in maintaining flexibility and length of life. It is desirable to use a minimum amount of plasticizer but sufficient to impart the necessary flexibility for long service with repeated flexing. The amount of plasticizer is usually between about 15 and about 35 weight percent. Since the incorporation of plasticizer reduces the maximum operating temperature permissible with the diaphragm, it is, therefore, preferred to use an amount of plasticizer between about 15 and about 25 weight percent where the service with the diaphragm in the valve is to be carried out under temperatures between about −17° F. and about 300° F.

The plasticizer to be incorporated with the high N. S. T. plastic of this invention is a low molecular weight polymer of trifluorochloroethylene having a minimum boiling point of about 230° F. at one millimeter of mercury and ranges up to the hard waxes having melting points of about 200° F. The preferred plasticizer is an oily fraction of polytrifluorochloroethylene polymer having a boiling range between about 280° F. and about 400° F. at one millimeter of mercury.

Figure 1 of the drawing is a diagrammatic illustration of a diaphragm valve containing the diaphragm of this invention.

Figure 2:
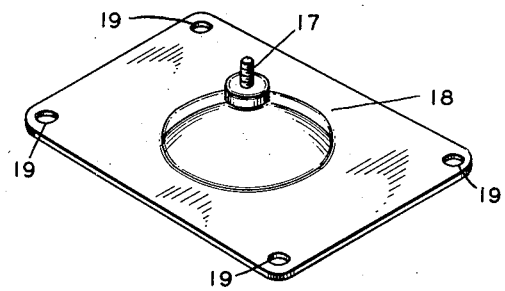

Figure 2 is a diagrammatic illustration of the diaphragm of the valve of Figure 1.

According to Figure 1, element 11 is a valve handle which is fixed to a valve stem 12. Housing 13 is provided for the valve stem and a diaphragm 18. The diaphragm 18 is attached to the valve stem by means of element 16 and element 17. Element 17 comprises a threaded member which is received by element or receiving member 16. Element 15 is the body of the valve and element 20 is the seat for the flexible diaphragm of the valve. Stem 12 is threaded and received in a threaded bore in casing 13. Element 16 is attached to stem 12 in such a manner that upon turning valve handle 11 valve stem 12 forces the valve head upward or downward depending upon the direction of screwing the valve handle.

According to Figure 2 element 18 is the rectangular bellowed diaphragm of the valve of Figure 1. Openings 19 are provided for positioning the diaphragm in the valve of Figure 1 by means of conventional bolts 21 which pass through housing 13 into the body of the valve 15. Element 17 of Figure 2 is the threaded member for attaching the diaphragm to receiving member 16 of Figure 1.

Generally the diaphragm should be as thin as consistent with the maintenance of a chemical barrier. Usually the diaphragm is not less than about 1/16 of an inch. Thinner diaphragms may be used but they must be sufficiently thick to be impermeable to chemicals in the valve. If thin diaphragms are used they may be used in combination with a supporting flexible material, such as rubber or rubber fabric combinations. Diaphragms as thick as 1/8 of an inch can be used. Thicker diaphragms are not usable because such diaphragms are not sufficiently flexible.

The diaphragms may be prepared by mechanically mixing the plasticizer and finely ground high N. S. T. plastic. The mixture is then molded in conventional equipment at a temperature of about 450° F. to 550° F. for a sufficient length of time to cause the mixture to flow into a uniform homogeneous mass. The molding is usually done under superatmospheric pressure to aid in the flow of the mixture and to form the ultimate homogeneous mass. After the homogeneous mass of the desired shape and form has been formed, the formed diaphragm is then removed from the mold and quenched to obtain an amorphous plastic diaphragm. Alternatively the formed diaphragm may be removed from the mold and slowly cooled after which it is reheated above the transition temperature and quenched to obtain an amorphous plastic diaphragm.

To distinguish the solid plastic polymer of trifluorochloroethylene over the corresponding oils and waxes used as plasticizers, the plastic polymer is described by reference to its no strength temperature. A no strength temperature (N. S. T.) is determined in the following manner: A thermoplastic sample of polytrifluorochloroethylene is hot pressed into a 1/16" thick sheet and cut into a strip of 1/8" x 1/16" x 1 5/8". The strip is notched 5/8" from the top so that the dimension at the notch shall be 1/16" x 1/16". A fine wire and a standard weight is attached to one end of the strip. The weight of the polymer plus the wire and standard weight shall equal 1/2 gram. The strip is then attached in a furnace and fixed vertically therein. The temperature of the sample is increased at a rate of about 1 1/2° C. per minute in the furnace as the breaking temperature is approached. The no strength temperature is the breaking temperature of the sample. Differences of about 5° C. are considered significant.

The plastic polymer of trifluorochloroethylene is prepared by homopolymerizing trifluorochloroethylene in the presence of a peroxy promoter at a temperature below 70° F., preferably at a temperature between −10° F. and +10° F. Suitable promoters for such polymerization include the halogen substituted acyl peroxides, such as bis-trichloroacetyl peroxide and the inorganic peroxides, such as potassium persulfate. Since the production of the plastic and the conditions for its production are known in the art and is not part of this invention, further discussion thereof is deemed unnecessary.

The plasticizer which is an oil or wax of polytrifluorochloroethylene may be produced directly by polymerizing trifluorochloroethylene at a temperature between about 150° F. and about 300° F. in the presence of a suitable peroxy promoter, such as benzoyl peroxide. The plasticizer may also be produced by cracking or pyrolyzing the thermoplastic polymer of trifluorochloroethylene at a temperature of about 600° F. to form an oily fraction which is separated and recovered from the product. This oily fraction contains oils and waxes suitable as plasticizers. If desired the cracked polymer may be stabilized by treatment with chlorine trifluorodie or cobalt trifluoride. Since the production of the oils and waxes of polytrifluorochloroethylene are known in the art and do not constitute part of this invention, further discussion thereof is deemed unnecessary.

Various modifications of the shape and size of the valve diaphragm may be made without departing from the scope of this invention. The diaphragm has utility in various devices where strength, flexibility and inertness are paramount.

Having described my invention, I claim:

1. In a diaphragm type valve comprising a diaphragm for closing the valve against a seat in the valve by the action of a valve stem, the improvement in the valve which comprises a diaphragm comprising a thermoplastic polymer of trifluorochloroethylene having an N. S. T. between about 250° C. and about 350° C. plasticized with between about 15 and about 35 weight percent of a lower molecular weight oil fraction of a polymer of trifluorochloroethylene boiling between about 230° F. and about 400° F. at 1 mm. of mercury, prepared by mechanically mixing the plasticizer and finely-ground thermoplastic polymer, molding said mixture at a temperature substantially above 390° F. to produce a uniform homogeneous-mass and quenching said homogeneous-mass while at a temperature above about 390° F. in cold water.

2. In a diaphragm type valve comprising a diaphragm for closing the valve against a seat in the valve by the action of a valve stem, the improvement in the valve which comprises a diaphragm consisting of an amorphous thermoplastic homopolymer of trifluorochloroethylene having an N. S. T. of about 300° C. plasticized with about 25 weight percent of a lower molecular weight oil fraction of polytrifluorochlorcethylene boiling between about 280° F. and about 400° F. at 1 mm. of mercury and having a thickness of not less than 1/16 of an inch and not greater than 1/8 of an inch, prepared by mechanically mixing the plasticizer and finely-ground thermoplastic polymer, molding said mixture at a temperature between about 450° F. and about 550° F. to produce a uniform homogeneous-mass and quenching said homogeneous-mass while at a temperature above about 390° F. in cold water.

3. In a diaphragm type valve comprising a diaphragm for closing the valve against a seat in the valve by the action of a valve stem, the improvement in the valve which comprises a diaphragm comprising an amorphous thermoplastic polymer of trifluorochloroethylene having an N. S. T. between about 250° C. and about 350° C. plasticized with between about 15 and about 35 weight percent of a lower molecular weight oil fraction of polytrifluorochloroethylene boiling between about 280° F. and about 400° F. at one millimeter of mercury and having a thickness not less than 1/16 of an inch and not greater than 1/8 of an inch, prepared by mechanically mixing the plasticizer and finely-ground thermoplastic polymer, molding said mixture at a temperature between about 450° F. and about 550° F. to produce a uniform homogeneous-mass and quenching said homogeneous-mass while at a temperature above about 390° F. in cold water.

4. A valve diaphragm comprising an amorphous thermoplastic polymer of trifluorochloroethylene having an N. S. T. between about 250° C. and about 350° C. plasticized with between about 15 and about 35 weight percent of a lower molecular weight oil fraction of a polymer of trifluorochloroethylene boiling between about 230° F. and about 400° F. at 1 mm. of mercury and having a thickness not less than 1/16 of an inch and not greater than 1/8 of an inch, prepared by mechanically mixing the plasticizer and finely-ground thermoplastic polymer, molding said mixture at a temperature substantially above 390° F. to produce a uniform homogeneous-mass and quenching said homogeneous-mass while at a temperature above about 390° F. in cold water.

5. A valve diaphragm comprising an amorphous thermoplastic polymer of trifluorochloroethylene having an N. S. T. between about 250° C. and about 350° C. plasticized with between about 15 and about 35 weight percent of a lower molecular weight oil fraction of a polymer of trifluorochloroethylene boiling between about 230° F. and about 400° F. at 1 mm. of mercury, prepared by mechanically mixing the plasticizer and finely-ground thermoplastic polymer, molding said mixture at a temperature substantially above 390° F. to produce a uniform homogeneous-mass and quenching said homogeneous-mass while at a temperature above about 390° F. in cold water.

6. A novel composition which comprises an amorphous thermoplastic polymer of trifluorochloroethylene having an N. S. T. between about 250° C. and about 350° C. plasticized with between about 15 and about 35 weight percent of a lower molecular weight oil fraction of a polymer of trifluorochloroethylene boiling between about 230° F. and about 400° F. at 1 mm. of mercury prepared by mechanically mixing the plasticizer and finely-ground thermoplastic polymer, molding said mixture at a temperature between about 450° F. and about 550° F. to produce a uniform homogeneous mass and quenching said homogeneous mass while at a temperature above about 390° F. in cold water.

7. A novel composition which comprises an amorphous thermoplastic polymer of trifluorochloroethylene having an N. S. T. between about 250° C. and about 350° C. plasticized with between about 15 and about 35 weight percent of a lower molecular weight oil fraction of a polymer of trifluorochloroethylene boiling between about 230° F. and about 400° F. at 1 mm. of mercury prepared by mechanically mixing the plasticizer and finely-ground thermoplastic polymer, molding said mixture at a temperature substantially above 390° F. to produce a uniform homogeneous-mass and quenching said homogeneous-mass while at a temperature above about 390° F. in cold water.

References Cited in the file of this patent

UNITED STATES PATENTS

| | | |
|---|---|---|
| 2,510,078 | Compton | June 6, 1950 |
| 2,600,802 | Passino | June 17, 1952 |
| 2,644,804 | Rubin | July 7, 1953 |
| 2,667,474 | Miller | Jan. 26, 1954 |

OTHER REFERENCES

Pulp and Paper Magazine of Canada, Dec., 1950, page 27. Preparation, Properties, and Technology of Fluorine and Organic Fluro Compounds, Slessner et al. (TP–245. F6–S5), 1951, pp. 636, 640 and 649.